United States Patent
Wang et al.

(10) Patent No.: US 6,231,469 B1
(45) Date of Patent: May 15, 2001

(54) INTERNALLY MESHING PLANETARY GEAR DEVICE

(75) Inventors: Hong You Wang; Jun Hirose; Shinji Juman; Toshio Yoshikawa, all of Tsu (JP)

(73) Assignee: Teijin Seiki Co., Ltd. (JP)

( * ) Notice: Subject to any disclaimer, the term of this patent is extended or adjusted under 35 U.S.C. 154(b) by 0 days.

(21) Appl. No.: 09/208,045

(22) Filed: Dec. 9, 1998

(30) Foreign Application Priority Data

Dec. 11, 1997 (JP) .................................................. 9-362101

(51) Int. Cl.[7] .................................................. F16H 1/32
(52) U.S. Cl. .................... 475/178; 475/162; 475/179; 475/180
(58) Field of Search .................................. 475/162, 177, 475/178, 179, 180

(56) References Cited

U.S. PATENT DOCUMENTS

| | | | |
|---|---|---|---|
| 1,694,031 | * 12/1928 | Braren | 475/178 X |
| 3,994,187 | * 11/1976 | Milenlovic | 475/162 X |
| 4,487,091 | * 12/1984 | Pierrat | 475/178 X |
| 4,621,543 | * 11/1986 | Gabilondo | 475/178 X |
| 5,211,611 | * 5/1993 | Lammers et al. | 475/178 |
| 5,431,605 | * 7/1995 | Ko | 475/178 X |

FOREIGN PATENT DOCUMENTS

| | | |
|---|---|---|
| 303709 | 1/1929 | (GB) . |
| 649235 | 1/1951 | (GB) . |
| 2086001 | 5/1982 | (GB) . |
| 58-102855 | 7/1983 | (JP) . |
| 58-149438 | 9/1983 | (JP) . |
| 6116439 | 5/1986 | (JP) . |
| 9836189 | 8/1998 | (WO) . |

* cited by examiner

Primary Examiner—Sherry Estremsky
(74) Attorney, Agent, or Firm—Rothwell, Figg, Ernst & Manbeck

(57) ABSTRACT

An internally meshing planetary gear device which comprises an internal gear having a circular arc tooth form and an outer gear of a planetary gear having an epitrochoid tooth form, the internal gear comprises pins, both ends of which are supported, and rolling bearings inserted onto the pins, and the rolling bearings have outer races meshing with the outer gear.

6 Claims, 8 Drawing Sheets

INTERNALLY MESHING PLANETARY GEAR DEVICE

BACKGROUND OF THE INVENTION

1. Field of the Invention

The present invention relates to an internally meshing planetary gear device wherein a circular arc tooth form is used for an internal gear and an epitrochoid tooth form is used for an outer gear of a planetary gear. More specifically, the present invention relates to useful art for simultaneously achieving high efficiency, low abrasion, low backlash, high loading ability, high rigidity, high precision and excellent control ability in a planetary gear device of such a type.

The present invention is aimed to enhance efficiency of a motion control device for an indexing device of a machine tool, an industrial robot or the like, or a servo actuator.

2. Description of Related Art

In conventional indexing devices used for machining center (MC), a combination of an AC servo motor and a worm gear reduction device is mainly used. However, a worm gear reduction device has extremely low efficiency and causes a problem when it is sped up due to a large slip between meshing surfaces and a high pressure at contact surfaces. Further, it also suffers from backlash due to the slip at the gear surfaces, and its efficiency further decreases. In order to avoid backlash, an adjusting mechanism is necessary, and maintenance of such an adjusting mechanism is troublesome.

Contrary to this, in addition to the worm gear reduction device, there are internally meshing planetary gear devices, wherein a circular arc tooth form is used for an internal gear, and wave gear devices, both of which are widely used at articulations of industrial robots, by which high reduction ratio can be obtained easily.

For example, Japanese Utility Model Publication No. Sho 61-16439 discloses an internally meshing planetary reduction device wherein an internal gear has a circular arc tooth comprising pins and rollers and an outer gear has a trochoid tooth form, characterized in that outer rollers which is longitudinally divided into two are rotatably supported on outer pins which are disposed on the internal surface of an annular frame which forms a housing of internal gear, and an intermediate supporting portion for supporting the outer pin is formed between the outer rollers which are longitudinally spaced from each other by a small distance.

Further, Japanese Utility Model laid-open No. Sho 58-102855 discloses an eccentric swing type reduction device comprising a case having internal teeth in a pin shape, a support block which is rotatable relative to the case, a pinion which has outer teeth meshing with the internal teeth and which performs eccentric revolution, and an eccentric crank mechanism which is disposed on the support block and which activates the pinion, characterized in that both ends of the pins are rotatably supported on the case by means of rolling bearings.

PROBLEMS TO BE SOLVED BY THE INVENTION

As described above, a combination of an AC servo motor and a worm gear reduction device, which combination is used in a conventional indexing device for MC, has a problem when the operating speed is enhanced since the efficiency of the worm gear reduction device is extremely low. Further, backlash increases due to slip between tooth surfaces, and accordingly, the efficiency decreases. An adjusting mechanism is required in order to reduce backlash, and maintenance of such an adjusting mechanism is troublesome.

In the above-described Japanese Utility Model Publication No. Sho 61-16439, the rolling bearings (rollers), which are supported on the pins, mesh with the trochoid tooth formed on the outer gear, and in this device, slip is inevitable at either position between the rollers and the outer gear or that between the rollers and the pins.

In the above-described Japanese Utility Model Laid-open No. Sho 58-102855, both the ends of the pin are supported by the rolling bearings, and the pin meshes with the outer gear. Since two outer gears, the phases of which are different from each other, mesh with one single pin at the same time, slip causes necessarily in at least one contacting portion. There is not disclosed any means for adjusting backlash in this prior art.

Further, Japanese Utility Model Laid-open No. Sho 58-149438 discloses a pin supporting a rolling bearing, one end of which pin is supported in a cantilever fashion. The device does not have sufficient rigidity, and contact condition is not uniform, and the mechanism for adjusting backlash is complicated.

However, in these reduction devices, slip between the meshing tooth surfaces inevitably occurs, and there is a problem of increase of backlash due to abrasion of the tooth surfaces. There is no mechanism for adjusting backlash during operation of these devices, and accordingly, these conventional reduction devices cannot be used actually as a high precision motion control device for an indexing device of an MC.

BRIEF SUMMARY OF THE INVENTION

OBJECTS OF THE INVENTION

It is an object of the present invention to speed up a motion control device, to reduce maintenance operation of the motion control device, and to enhance the efficiency of the motion control device. More specifically, it is an object of the present invention to provide a speed increasing or reducing device suitable for precious motion control by which decrease or change of the efficiency is small as it is operated, which has s mall backlash, small hysteresis and high linearity so that the output highly corresponds to the input, by which the efficiency is high and the change in efficiency is small so that the loading torque or inertia at the output can be estimated from the input value, and which has high rigidity.

MEANS TO SOLVE THE PROBLEMS

According to the present invention, the above-described object is achieved by an internally meshing planetary gear device which comprises an internal gear having a circular arc tooth form and an outer gear of a planetary gear having an epitrochoid tooth form, the internal gear comprises pins, both ends of which are supported, and rolling bearings inserted onto the pins, and the rolling bearings have outer races meshing with the outer gear.

Further, the present invention achieves the object by a method for fabricating an internally meshing planetary gear device wherein a circular arc tooth form is used for an internal gear and an epitrochoid tooth form is used for an outer gear of a planetary gear, characterized in that rolling bearings are used as the internal gear which meshes with the outer gear, that the rolling bearings are supported by pins which are supported at both ends thereof, fitting clearance of the pins being so selected that the pins can be inserted freely into the rolling bearings and the epitrochoid gear form of the outer gear being modified so as to avoid interference between tooth tip and tooth base, that the pins are freely inserted into the rolling bearings without pressurizing tooth surfaces locating at a predetermined meshing position and that the tooth surfaces are pressurized at meshing positions other than the predetermined meshing position due to displacement of the planetary gear from the meshing position.

The present invention provides the internally meshing planetary gear device, wherein the circular arc tooth form is used for the internal gear and the epitrochoid tooth form is used for the outer gear of the planetary gear, and the means meshing with the outer gear is the outer races of the rolling bearings which are inserted onto the pins, the both ends of which are supported. The fitting clearance between the pins supporting the rolling bearings and the rolling bearings includes such a clearance that the pins can be freely inserted into the rolling bearings. Further, in order to easily reduce backlash, adequate pins are so selected taking into consideration the diameter of the outer gear and the diameter of the internal gear that the tooth surfaces are pressurized. The fitting between the pins and the rolling bearings is clearance fit, and it is preferred that the tooth form of the outer gear is modified so as to avoid interference between the tooth tip and the tooth base. Thus, the pins for supporting the rolling bearings can be easily inserted into the rolling bearings without making any resistance against the tooth tip and tooth base, and the reduction device can be fabricated. As the diameter of the pins increases, the pressurization upon the tooth surfaces increases. Since the meshing portions form rolling engagement, crank pins can be rotated readily even if the tooth surfaces receive a large amount of pressurization, and accordingly, pins can be successively inserted. In short, changing the sizes in diameter of the pins, pressurization can be easily adjusted, and back lash can be reduced. Further, even if initial deformation occurs due to pressurization at the tooth surfaces or even if some amount of manufacturing error is included, a number of teeth can mesh under the condition wherein no load is applied, precision, rigidity, and linearity can be improved.

It is preferred that semi circular grooves are formed at positions where the pins of the internal gear are supported, so that the structure is easily subjected to an inner grinding operation and can be finished at high precision.

BRIEF DESCRIPTION OF THE SEVERAL VIEWS OF THE DRAWINGS

The present invention will now be explained in detail with referent the accompanying drawings, wherein.

PREFERRED EMBODIMENTS

Figure 1:
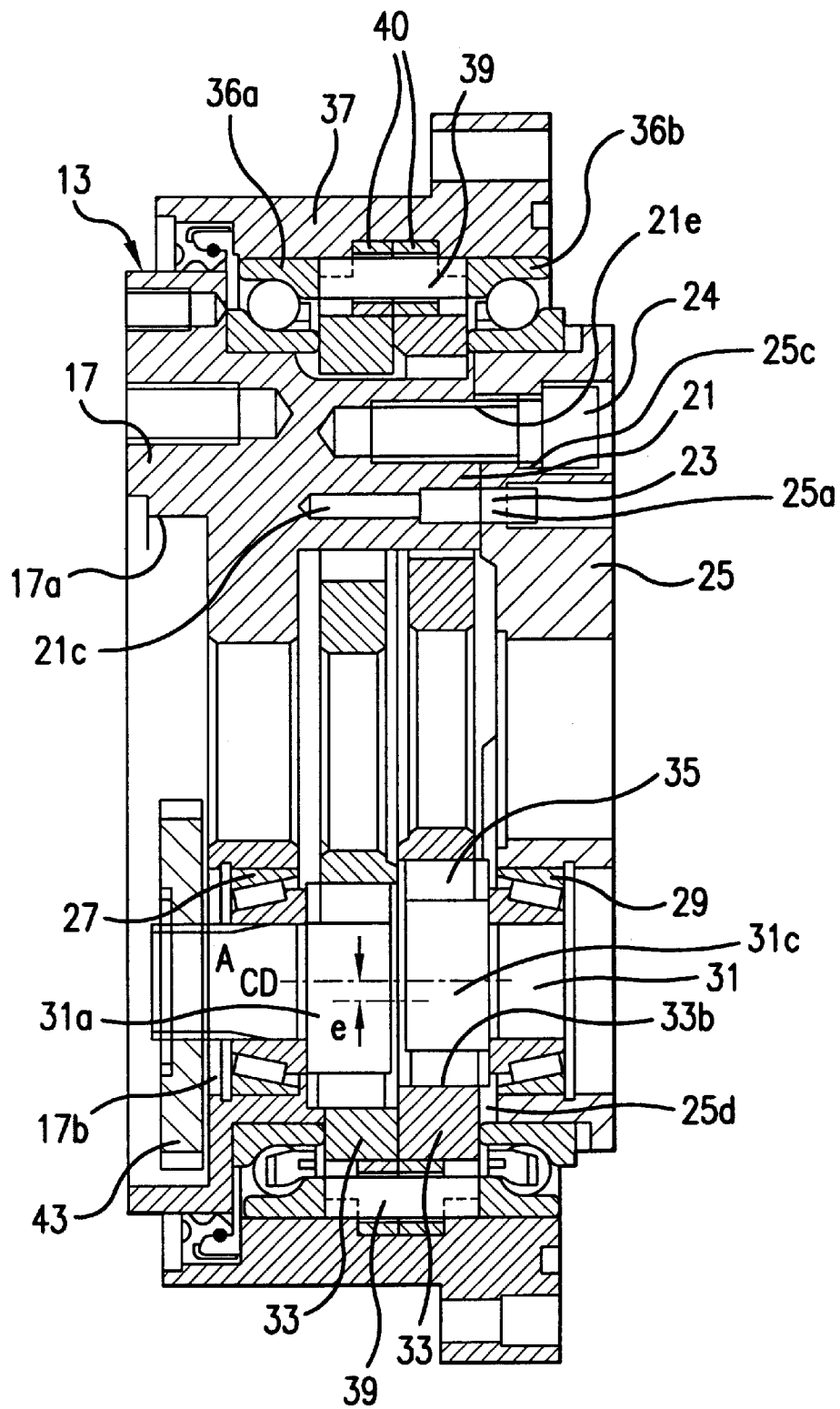
FIG. 1 is a cross sectional view of the first embodiment of the present invention.

As illustrated in FIG. 1, a support block 13 comprises a circular disc portion 17 and column portions 21 extending from the disc portion 17. The disc portion 17 has a recess 17a at the back side thereof, which recess accommodates a second outer gear 43 therein, and bearing holding holes 17b at positions between the neighboring column portions 21 of the front side thereof, which holes have a predetermined depth. Further, as illustrated in FIG. 1, pin holes 21c are formed at the top of the column portions 21 in order to integrally connect a side plate 25 which is a part of the support block 13 to the column portions 21 by means of pins 23. The pin 23 has a sufficient size so that it can bear shearing stress caused by the load. The column portion 21 has screw holes 21e to which bolts 24 are threaded to fasten the end plate 25 to the column portions 21 of the support block 13.

In FIG. 1, the end plate 25 has pin holes 25a at positions corresponding to the pin holes 21c formed in the column portions 21, bolt through holes 25c at positions corresponding to the screw holes 21e, and bearing holding holes 25d corresponding to the bearing holding holes 17b formed in the disc portion 17.

Roller bearings 27 and 29 are inserted in the bearing holding holes 17b and 25d, and ends of a crank pin 31 is rotatably supported by the roller bearings 27 and 29 so that the crank pin 31 receives rotation of two pinions 33 around their axis. The crank pin 31 has two crank portions 31a and 31c which are offset from the rotational axis $A_{CD}$ by a distance e, and the pinions 33 are inserted onto the crank portions 31a and 31c via bearings 35.

Figure 2:
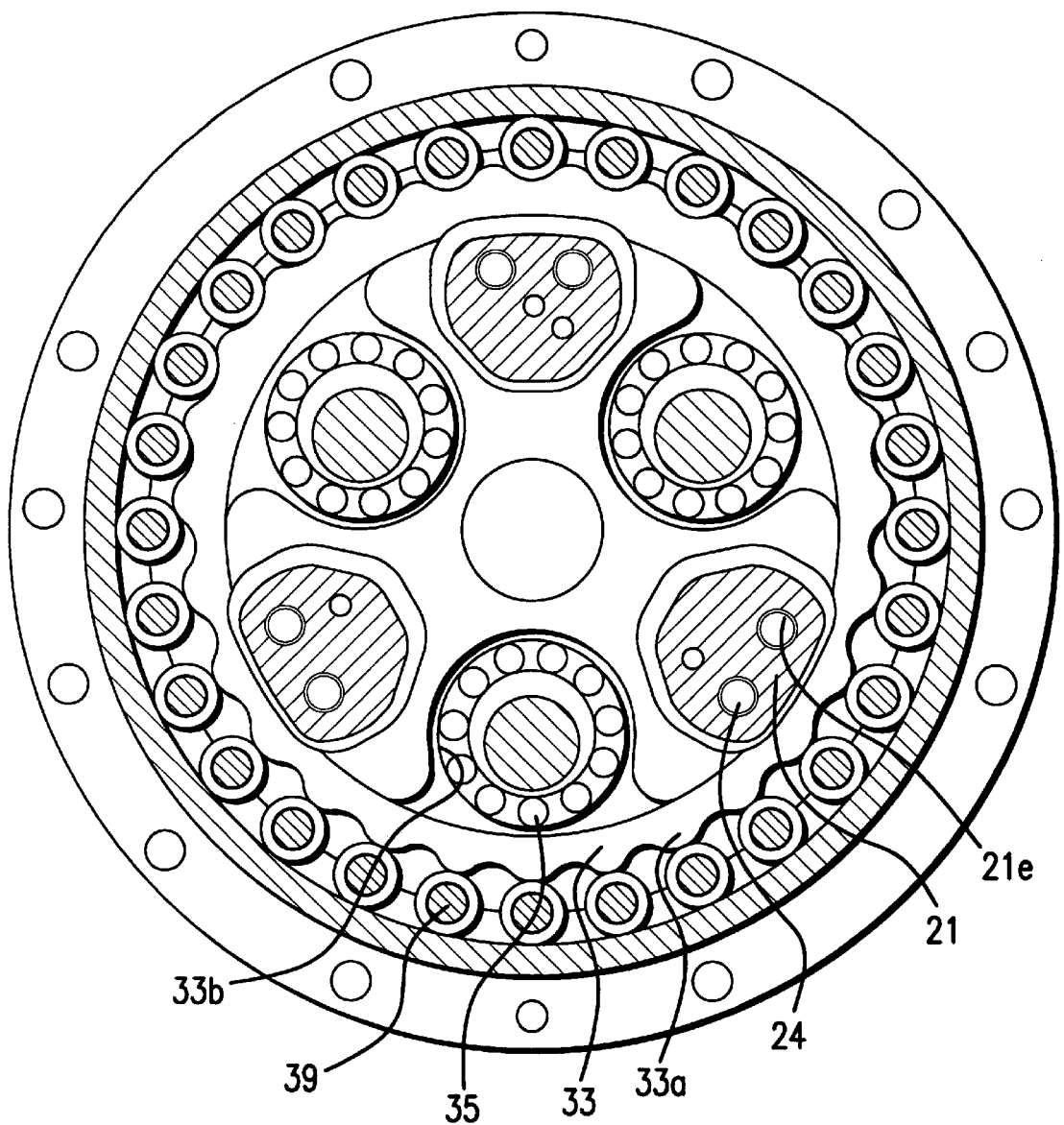
FIG. 2 is a sectional view of FIG. 1.

As illustrated in FIG. 2, the pinion 33 (i.e., a planetary gear) has outer teeth 33a at the outer periphery thereof, for which teeth epitrochoid tooth form is used, and pin holes 33b formed therein, which engage with the crank portion 31a or 31c of the crank pin 31 via the bearings 35.

Figure 3:
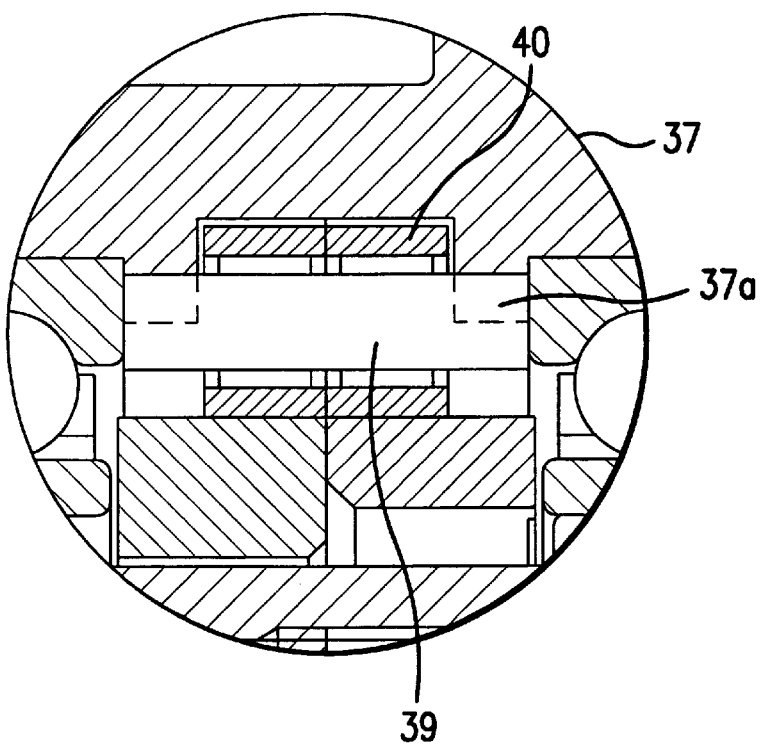
FIG. 3 is a cross sectional view showing the detailed construction rolling bearing in FIG. 1.
Figure 4:
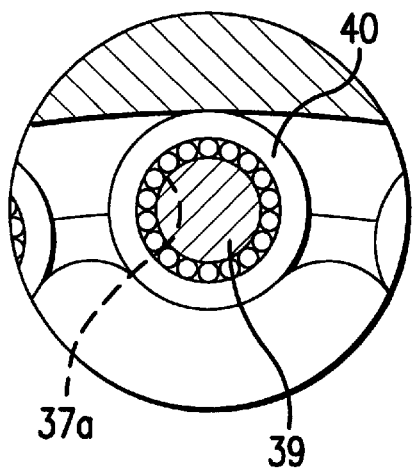
FIG. 4 is a side view of FIG. 3.

In this embodiment, as illustrated in FIG. 1, ball bearings 36a and 36b are fitted onto the outer peripheries of the disc portion 17 of the support block 13 and the end plate 25 so as to rotatably support a hub 37. The hub 37 has pins 39 having a small diameter and equidistantly formed at the inner periphery thereof, the number of which pins is slightly larger than that of the outer teeth 33a formed at the outer periphery of the pinions 33. More specifically, semi circular grooves 37a (FIGS. 3 and 4), the number of which is the same as that of the small diameter pins 39, are equidistantly formed at the inner periphery of the hub 37. The small diameter pins 39 are inserted into the semi circular grooves 37a, and thus, both the longitudinal ends of the small diameter pins 39 are supported. As illustrated in FIG. 1, side surfaces of the outer races of the bearings 36a and 36b locate at the longitudinal side ends of the small diameter pins 39 so that the small diameter pins 39 are prevented from their longitudinal movement.

The small diameter pin 39 is inserted into two rolling bearings 40 and 40, and the outer races of the rolling bearings 40 and 40 are so arranged that they mesh with the outer teeth 33a of the pinions 33, which are outer gear as illustrated in FIG. 2. The inner races of the rolling bearings 40 and 40 were omitted and the small diameter pin 39 was directly fitted in the above-described embodiment. However, in some cases, as shown in the second embodiment illustrated in FIGS. 5 and 6, the small diameter pins 39 may be inserted into the inner races of the rolling bearings 40 and 40.

Under the construction described above, the pinions 33 are loosely inserted into the column portions 21 of the support block 13. As the crank pin 31 rotates, the central axis of the crank portions 31a and 31c revolves around the central axis of the crank pin 31. Thus, the two pinions 33 perform offset revolution, and the outer teeth 33a engage with the outer races of the rolling bearings 40 and 40 which are supported by the pin of the hub 37.

The rotation of the output shaft of a motor (not shown), such as a servo motor, is transmitted through a first outer gear (not shown) which is secured to the output shaft or the input shaft (not shown), and it is reduced in accordance with the gear ratio between the first outer gear and the second outer gear 43 meshing with the first outer gear. As the second outer gear 43 rotates, the crank portion 31a of the crank pin 31, which is rotatably supported on the support block 13, revolves, and the pinions 33 revolve in an offset fashion as the crank portions 31 revolve, since the pin holes 33b of the pinions 33 engage with the crank portion 31a via the bearings 35.

In this occasion, a plurality of crank pins 31 are so constructed that only the rotational element can be taken out from the pinions 33 and transmitted to the hub 37 among the revolving element and rotational element of the pinions 33. Thus, in accordance with the revolving movement of the pinions 33, the outer teeth 33a formed at the outer peripheries of the pinions 33 successively engage with the outer races of the different rolling bearings 40, ends of which are supported at the inner periphery of the hub 37, and the hub 37 is rotated at a reduced speed. Thereafter, the output is taken out from a sprocket (not shown) secured to the hub 37.

The fabricating procedure of the planetary gear reduction device illustrated in FIGS. 1 and 2 will now be explained. The bearings 27 are fitted to the bearing holding holes 17b of the disc portion 17 which forms the support block 13, and the left portions in FIG. 1 of the crank pins 31 are set to the bearings 27.

Then, two pinions 33 are inserted onto both the column portion 21 of the support block 13 and the crank pins 31.

In the meantime, the rolling bearings 40 are fitted to the portions, which correspond to the semi circular grooves in the hub 37 where the pins 39 will be fitted later. The number of the rolling bearings 40 is selected to be the same as that of the semi circular grooves 37a formed in the hub 37.

The ball bearing 36a is fitted to the outer periphery of the disc portion 17 of the support block 13, and then, the hub 37 which has the rolling bearings 40 fitted thereto as described above is inserted onto the ball bearing 36a . Thus, the support block 13 and the hub 37 locate coaxially and become in a double cylinder condition, and the crank pins 31a become in such a condition that they are fitted to the support block 13.

More specifically, a predetermined number of rolling bearings 40 are fitted between the outer gear teeth 33a formed at the periphery of the pinions 33 and the hub 37. However, any pins 39 have not been inserted into the rolling bearings 40, and accordingly, the rolling bearings 40 can move slightly around the fitting positions.

Figure 7:
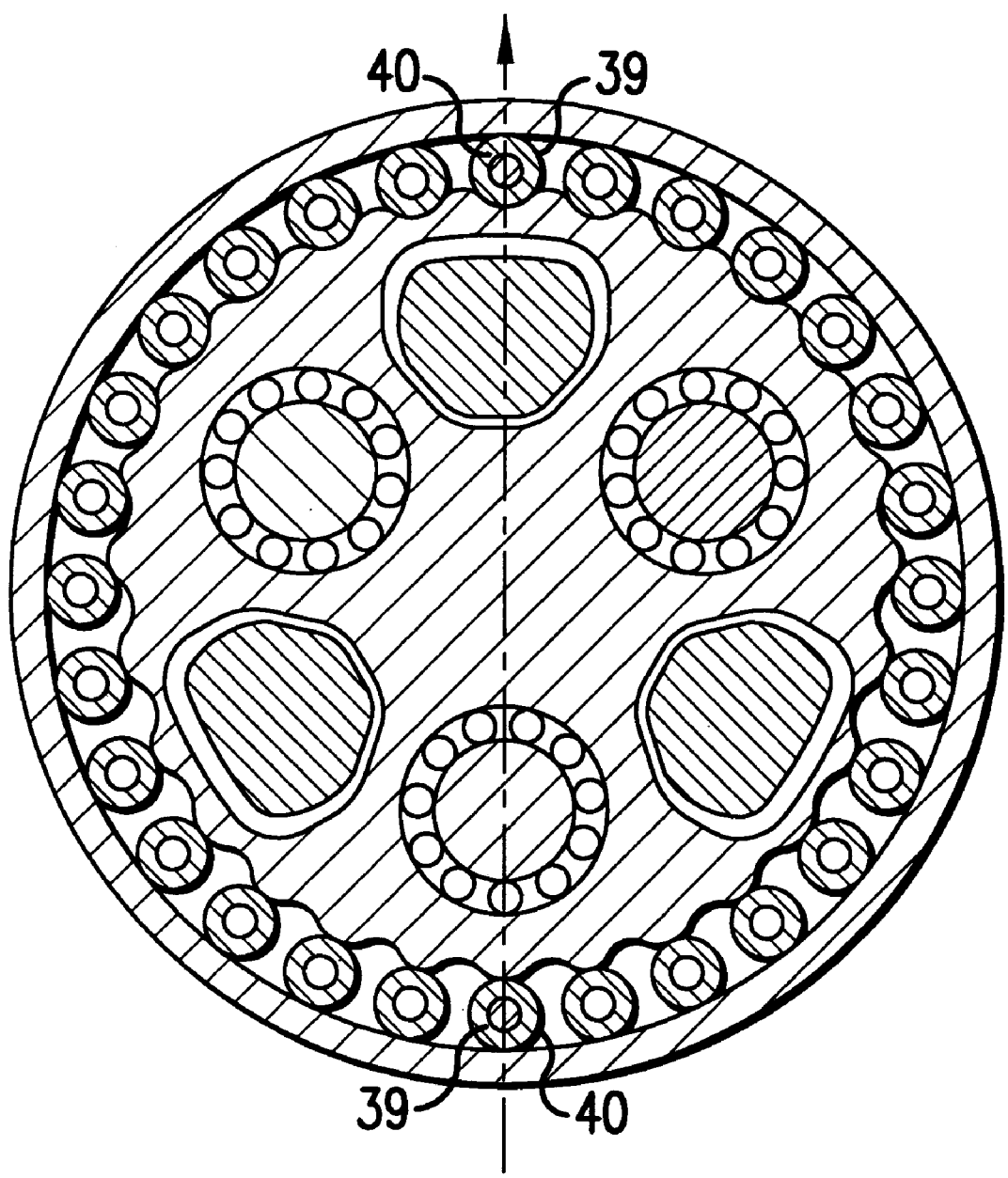
FIG. 7 is a front view showing a step for fabricating the planetary reduction device of the present invention.

Then, as illustrated in FIG.7, one pair of pins 39 are inserted into the rolling bearings 40 which locate at the positions being coincident with the offset direction of the crank pin 31. Then, both the ends of the pin 39 are set at the semi circular grooves 37a of the hub 37. Please be advised that under this condition, the pinion 33 are offset due to the offset of the crank pin 31, and accordingly, there are clearances between the hub 37 and the tops of the tooth 33a of the pinions 33. Therefore, the pins 39 can be fitted easily to the semi circular grooves 37a.

Figure 8:
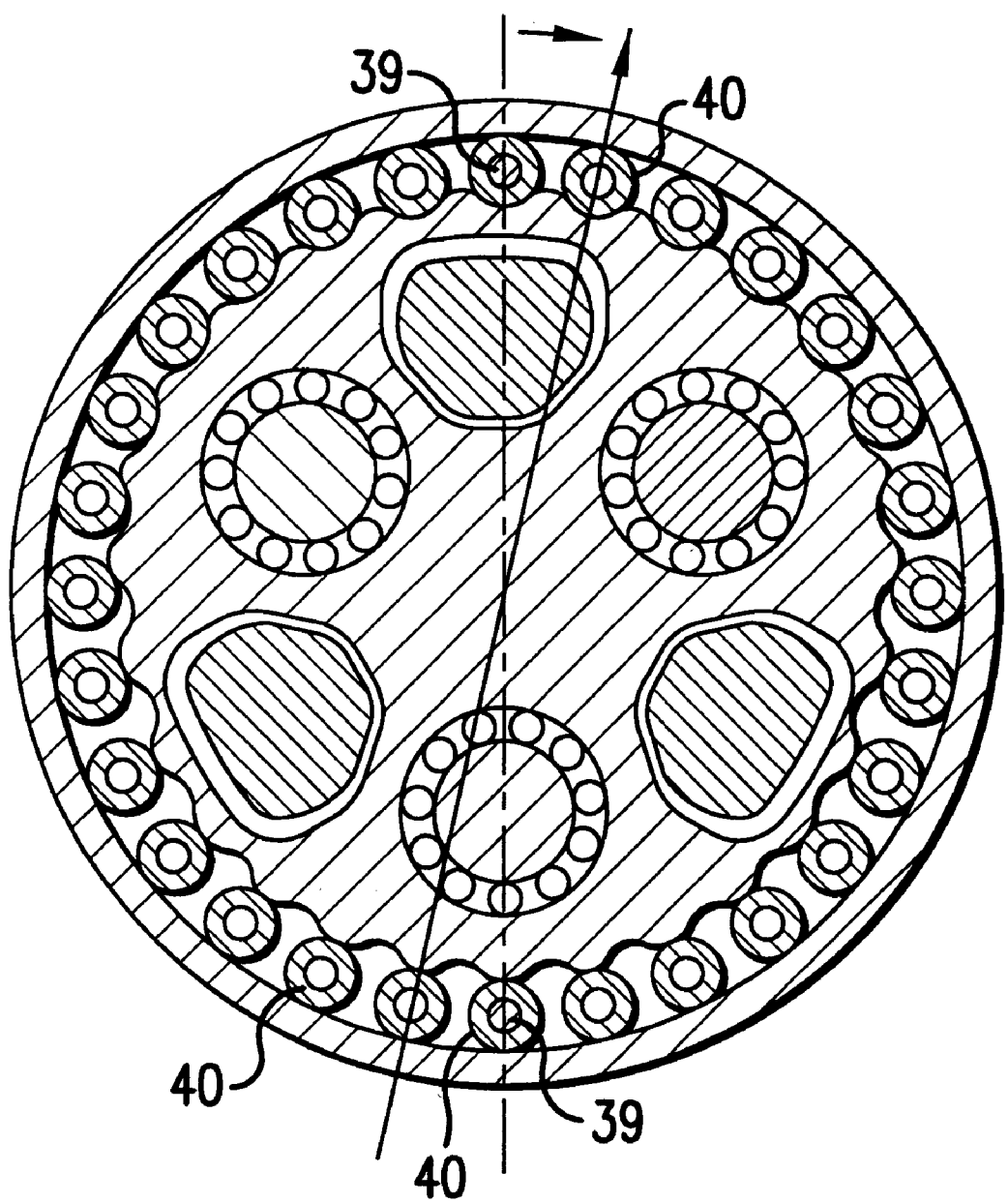
FIG. 8 is a front view showing another step for fabricating the planetary reduction device of the present invention; a FIG. 9 is a front view showing a still other step for fabricating the planetary reduction device of the present invention.
Figure 9:
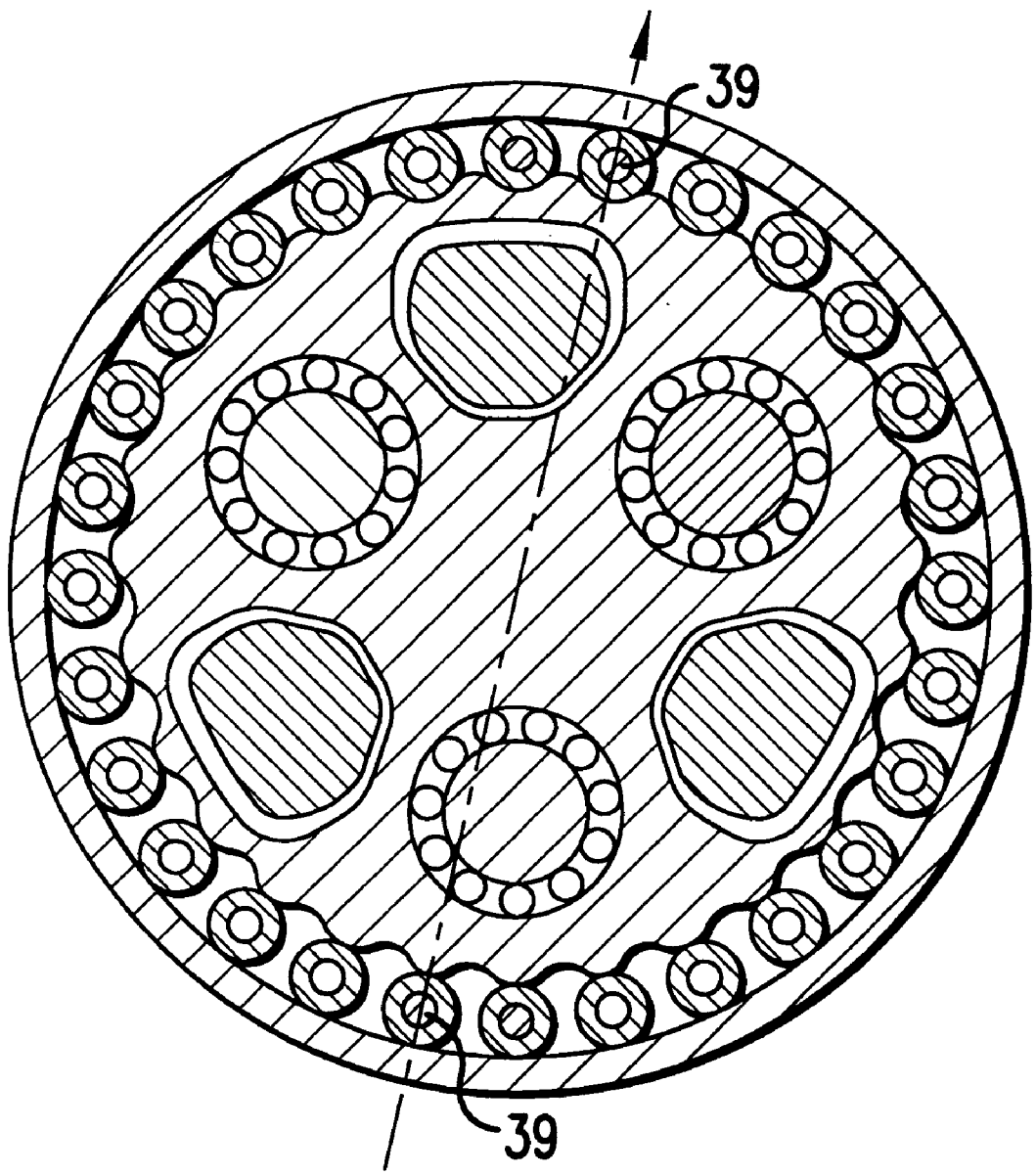

After a pair of the pins 39 have been inserted into two pairs of rolling bearings 40 which are located at positions in an offset direction of the crank pin 31 in accordance with the above-described step, the crank pin 39 is rotated in an arrow direction in FIG. 8 by an amount equal to the distance between the neighboring rolling bearings 40. Accordingly, the offset direction of the crank pin 31 is varied as illustrated in FIG. 8. Consequently, the offset direction of the pinions 33 also varies Under this condition, as illustrated in FIG. 9, another pair of pins 39 are inserted into the next rolling bearings 40 which are coincident with the offset direction of the crank pin 31, and both the ends of the pin 39 are secured to the semi circular grooves 37a formed in the hub 37.

The crank pin 31 is rotated successively, and other pins 39 are successively inserted one by one into a pair of rolling bearings 40 which have located in a direction coincident with the offset direction of the crank pin 31. After all the rolling bearings 40 have pins 39 inserted therein, another ball bearing 36b is fitted between the hub 37 and the front end of the disc portion 17 of the support block 13, and then, the end plate 25 covers the end. After the disc portions 17 and the end plate 25 are positioned by means of positioning pins 23, the bolts 24 fasten the disc portions 17 and the end plate 25 so that the rigid support block is constructed.

In accordance with the above-described steps, the rolling bearings 40 which mesh with the outer teeth 33a of the pinion 33 are supported on the pins 39, both the ends of which are supported. In this occasion, the fitting between the pins 39 which support the rolling bearing 40 and the rolling bearings 40 must have such a clearance that the pins 39 can be freely inserted into the rolling bearings 40. Further, in order to reduce backlash, pins 39 having an appropriate size are selected taking into consideration the diameter of the outer gear (pinion 33) and the diameter of the internal gear which is constructed with the rolling bearings 40 so that pressurization take place between the outer races of the rolling bearings 40 and the tooth surfaces of the outer gear (pinion 33). The fitting between the pins 39 and the rolling bearings 40 is selected to be clearance fit. The tooth form, i.e., the tooth tip and the tooth base, of the outer gear (pinion 33) is modified so that the pins 39 which support the rolling bearings 40 can be easily inserted into the rolling bearings 40 without making any resistance against the tooth tip and the tooth base.

Figure 5:
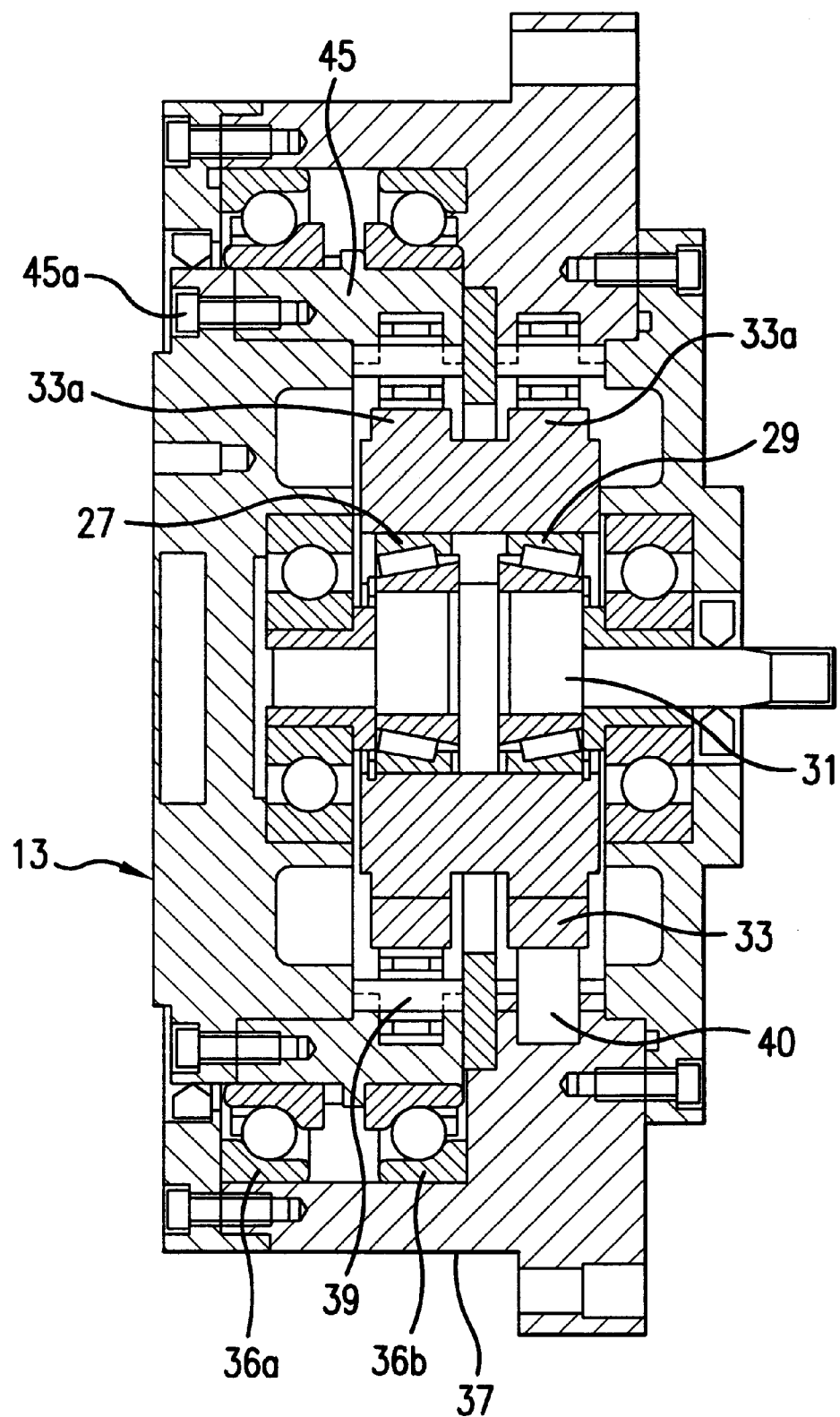
FIG. 5 is a cross sectional view of the second embodiment.
Figure 6:
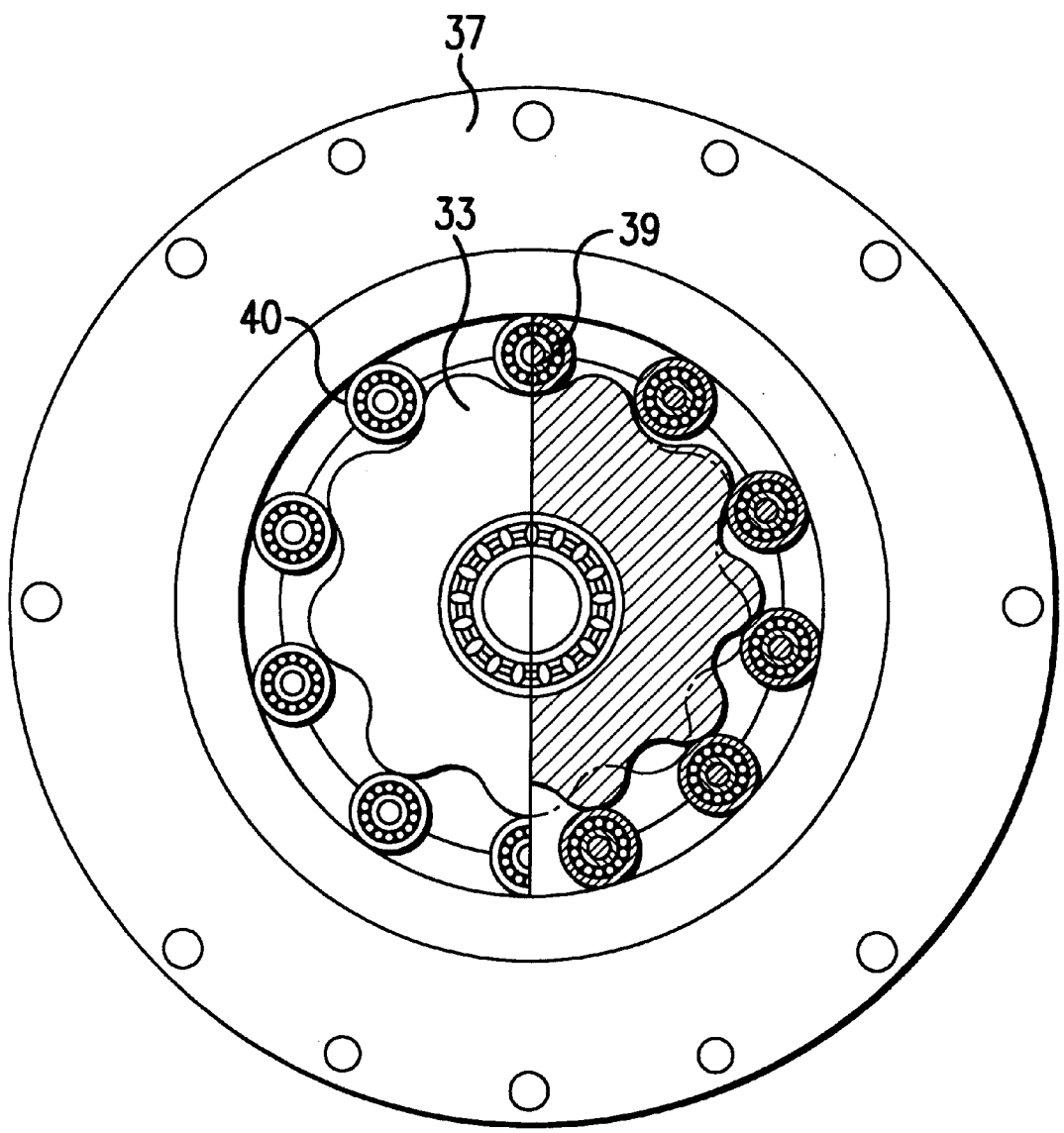
FIG. 6 is a partially sectioned side view of FIG. 5

In the second embodiment illustrated in FIGS. 5 and 6, an input shaft 31 has a crank pin constructed therein, and the input shaft (crank pin) 31 engages with the inner periphery of the pinion 33 via roller bearings 27 and 29. The pinion 33 has two outer gear tooth portions formed at the periphery thereof. The disc member 45 is detachably secured to the support block 13 by means of bolts 45a. Since the disc member 45 and the support block 13 can be detached, fabrication of the ball bearings 36a and 36b, small diameter pins 39 and the rolling bearings 40 can be done easily.

ADVANTAGES OF THE INVENTION

According to the present invention, speeding up of a motion control device, reduction of maintenance operation of the motion control device, and enhancement of the efficiency of the motion control device can be achieved. More specifically, the present invention provides a speed increasing or reducing device suitable for precious motion control by which decrease or change of the efficiency is small as it is operated, which has s mall backlash, small hysteresis and high linearity so that the output highly corresponds to the input, by which the efficiency is high and the change in efficiency is small so that the loading torque or inertia at the output can be estimated from the input value, and which has high rigidity.

What is claimed is:

1. An internally meshing planetary gear device which comprises an internal gear having a circular arc tooth form, and an outer gear of a planetary gear having an epitrochoid tooth form, said internal gear comprises pins, both ends of which are supported wherein semi circular grooves are formed at positions where said pins of said internal gear are supported, and rolling bearings inserted onto said pins, and said rolling bearings have outer races meshing with said outer gear.

2. An internally meshing planetary gear device according to claim 1 wherein it has a plurality of said planetary gears.

3. An internally meshing planetary gear device according to claim 1 which is used as a motion control device for an MC indexing device together with a servo motor.

4. An internally meshing planetary gear device which comprises an internal gear having a circular arc tooth form and an outer gear of a planetary gear having an epitrochoid tooth form, said internal gear comprises pins, both ends of which are supported wherein semi circular grooves are formed at positions where said pins of said internal gear are supported, and rolling bearings inserted onto said pins, said rolling bearings have outer races meshing with said outer gear, and the gear form of said outer gear is modified so as to avoid interference between tooth tip and tooth base.

5. An internally meshing planetary gear device according to claim 4 wherein it has a plurality of said planetary gears.

6. An internally meshing planetary gear device according to claim 4 which is used as a motion control device for an MC indexing device together with a servo motor.

* * * * *